United States Patent
Morita et al.

[15] 3,700,322
[45] Oct. 24, 1972

[54] PHOTOGRAPHING ARRANGEMENT FOR USE WITH A CATHODE-RAY TUBE

[72] Inventors: Yasuyuki Morita; Tsutomu Nishino, both of Kadoma, Japan

[73] Assignee: Matsushita Electric Industrial Company, Limited, Kadoma, Osaka, Japan

[22] Filed: Sept. 4, 1970

[21] Appl. No.: 69,648

[30] Foreign Application Priority Data

Sept. 5, 1969    Japan .....................44/85646

[52] U.S. Cl. ..................................................355/1
[51] Int. Cl. .............................................G03b 27/00
[58] Field of Search .....355/1; 352/221, 227; 95/11 S

[56] References Cited

UNITED STATES PATENTS

| | | | |
|---|---|---|---|
| 3,142,236 | 7/1964 | Siegmund et al. | 95/11 S |
| 3,398,669 | 8/1968 | Hicks | 355/1 |
| 2,455,206 | 11/1948 | Wienke | 352/227 |

OTHER PUBLICATIONS

"Page–Width Fiber–Optic CRT" Electronics, Vol. 34, No. 34, Aug. 25, 1961; page 76

*Primary Examiner*—John M. Horan
*Assistant Examiner*—Kenneth C. Hutchison
*Attorney*—McCarthy, Depaoli & O'Brien

[57] ABSTRACT

A method and arrangement for photographing optical images such as oscillographic waveforms displayed on a faceplate of a cathode-ray tube, wherein a glass fiber screen is attached to the faceplate to form a display surface at the leading end of the glass fiber screen and a sensitized photographic film is placed directly upon the display surface of the glass fiber screen so that the images on the display surface are photographed on the film without use of a lens or lenses interposed between the film and the faceplate. The contact pressure between the film and the display surface is in operation maintained at a desired constant value through detection and conversion into electrical signals of the contact pressure for direct reading of the contact pressure.

5 Claims, 3 Drawing Figures

Patented Oct. 24, 1972
3,700,322
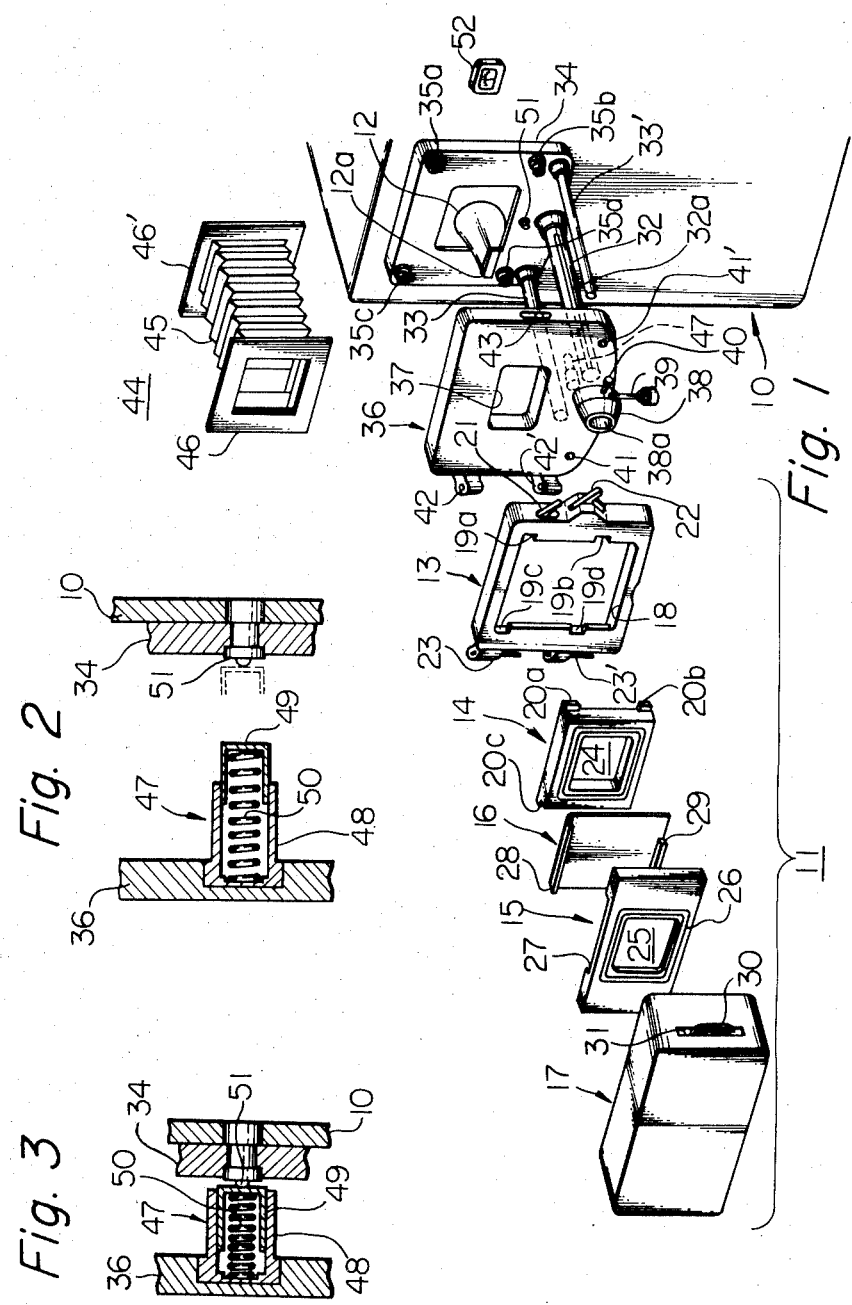
INVENTORS
YASUYUKI MORITA
BY TSUTOMU NISHINO
McCarthy, Depaoli & O'Brien
ATTORNEYS

PHOTOGRAPHING ARRANGEMENT FOR USE WITH A CATHODE-RAY TUBE

The present invention relates to photographing and, more particularly, to a method and arrangement for photographing optical images on a faceplate of cathode-ray tube.

In photographing optical images such as oscillographic waveforms displayed on a faceplate of a cathode-ray tube, it is presently a common practice to have the optical images focussed on a sensitized photographic film through a lens or lenses positioned between the film and the faceplate. The use of such extra lens or lenses results in an increased number of components and parts of the photographing device, which consequently is reflected by an increased production cost and rather complicated photographing operations when the photographing device is put on practical use. What is more important, the resolution of the resultant images photographed on the photographic film is necessarily degraded where a lens or lenses are interposed between the film and the faceplate of the cathode-ray tube.

It is, therefore, and important object of the present invention to provide an improved arrangement for photographing optical images on a faceplate of a cathode-ray tube, the arrangement being simple in construction and easy to manipulate.

It is another important object of the invention to provide a photographing device which is capable of photographing an optical image on a faceplate of a cathode-ray tube with a satisfactory resolution.

In order to achieve these and other objects, the invention contemplates removal of a lens or lenses which are conventionally interposed between the photographic film and the faceplate of the cathode-ray tube. According to a first essential aspect of the present invention, therefore, a glass fiber screen is attached to the faceplate of the cathode-ray tube so as to form a display surface at the leading or outer end of the glass fiber screen and the sensitized photographic film is placed directly on the display surface bearing the optical images thereon so that the optical images are photographed on the film without use of an extra lens or lenses mounted in between. According to a second essential aspect of the invention, the contact pressure between the film and the display surface is in operation detected and converted into corresponding electric signals. The resultant electric signals are registered on a contact pressure indicator for visual reading so that the photographic film is pressed upon the display surface at a constantly regulated pressure.

Any type of cathode-ray tube may be utilized to put the present invention into practice where it is desired to photograph the optical images displayed on the faceplate of the cathode-ray tube.

In the method and arrangement for photographing optical images on the faceplate of a cathode-ray tube, a glass fiber screen is attached to the faceplate to form an image display surface at the leading or outer end of the screen. This is advantageous because the display surface can be protruded from the surface of the faceplate of the cathode-ray tube, thus facilitating the photographic film to approach and contact the display surface. Provision of the glass fiber screen with a display surface formed at its leading end is also beneficial for compensating for the curvature of the faceplate of the cathode-ray tube and for shaping the frame of the optical image as desired.

A sensitized photographic film, which is loaded in a suitable photographing means, is placed apart from the display surface of the glass fiber screen through which the optical image on the faceplate of the cathode-ray tube is guided to and displayed on the display surface. The photographic film is then moved together with the photographic means toward the display surface until the former contacts the latter. The photographic film is thus pressed closely upon the display surface and the pressure, at which the film is made to contact the display surface, is detected and converted into electric signals corresponding thereto. In this instance, the contact pressure between the film and the display surface may be modified for linearly continuous detection and convertion of the contact pressure into the electric signals. The resultant electric signals are visually registered on a contact pressure indicator for being read directly with human eyes, so that the contact pressure between the film and the display surface can be adjusted to and maintained at a constant value. The image guided from the faceplate of the cathode-ray tube to the display surface of the glass fiber screen is in this manner photographed by manipulation of the photographing means.

The photographing means applicable to the method and arrangement according to the invention may be of any known type but, preferably, the means may include a mechanism by which images can be photographed on different positions of a single photographic film.

The arrangement to carry out the above described method is shown in the accompanying drawings, in which:

FIG. 1 is an exploded view of an arrangement according to the invention;

FIG. 2 is a sectional view of a pressure detecting means used in the arrangement of FIG. 1, the detecting means being shown as kept inoperative; and FIG. 3 is similar to FIG. 2, but the pressure detecting means is herein shown as being operative.

Referring to the drawings, particularly to FIG. 1, the photographing arrangement according to the invention is shown as used in combination with a measuring instrument 10 and a photographing means or camera assembly which is generally represented by reference numeral 11. The measuring instrument 10, used for the measurement and registration of varying electric and other characteristics or phenomena, includes a cathode-ray tube, not shown, which is accommodated therein for visual observation of such varying characteristics or phenomena at its faceplate, not shown.

A glass fiber screen 12 is attached to the faceplate of the cathode-ray tube, forming at its leading end an image display surface 12a of selected configuration and size.

The photographing means or camera assembly 11 is essentially made up of a camera frame structure 13, a slide frame 14 engageable with the camera frame structure 13, a camera pack frame structure 15, a shutter panel 16 engageable with the camera pack from structure 15 and a camera pack body 17 loaded with a photographic film. The structures and members 13 to 17 are all held together as will be discussed in more detail.

The camera frame structure 13 has formed therein an opening 18 which is shaped and sized to receive therein the slide frame 14 through engagement of recesses 19a, 19b, 19c and 19d formed on the frame structure 13 with claws 20a, 20b, 20c and 20d, respectively, formed on the slide frame 14, wherein the claw 20d is shown as concealed behind the frame 14 and hence not identified. A stop member 21 may be mounted on the frame structure 13 for stepwisely moving the slide frame 14 which is held in engagement with the frame structure 13. The camera frame structure 13 is also provided with a stop member 22 and pivotal shafts 23 and 23' secured to the frame structure 13 for the reason hereinafter discussed.

The slide from frame 14 and the camera pack frame structure 15 have formed therein openings 24 and 25, respectively, which are shaped and sized in alignment with each other. Designated by reference numeral 26 is a light-interceptive felt member mounted on the camera pack frame structure 15. The camera pack frame structure 15 has formed on one side thereof a depression 27 which is adapted for engagement with the shutter panel 16. The shutter panel 16 has a bent portion 28 formed at its upper edge and a stop member 29 mounted at its lower edge, as illustrated. The camera pack body 17 has loaded therein a sensitized photographic film 30 which can be drawn out thereof through an elongated slot 31. The slide frame 14 and the camera pack frame structure 15, engaging with each other through the shutter panel 16 received in the depression 27 in the latter, are accommodated in the camera pack body 17 and are mounted on the camera frame structure 13 through engagement of the recesses 19a to 19d of the frame structure 13 with the claws 20a to 20d of the slide frame 14.

Now, according to the invention means is provided to move the thus constructed photographing means or camera assembly 11 toward and away from the display surface 12a of the glass fiber screen 12 attached to the cathode-ray tube. The means for moving the camera 11 includes a main guide spindle 32 and auxiliary guide spindles 33 and 33', all of which are mounted in parallel to each other on a support structure 34 which is fixed relative to the cathode-ray tube to the wall of the measuring instrument 10 through fastening means 35a, 35b, 35c and 35d. It is preferable that guide spindles 32, 33 and 33' be mounted at a lower portion of the support structure 34 so as to provide a ready access to a space between a camera frame support member 36 and the support structure 34. The auxiliary guide spindles 33 and 33' are herein shown as two in number but the same may be provided in any desired number. The main guide spindle 32 is provided with a rack 32a.

The camera frame support member 36 included in the camera moving means has formed therein an opening 37 which is shaped, sized and positioned in alignment with the display surface 12a and with the openings 24 and 25 in the slide frame 14 and the camera pack frame structure 15, respectively. On the camera frame support member 36 is mounted a boss member 38 which is internally hollowed to form an axial bore 38a through which the main guide spindle 32 is slidably inserted. The boss member 38 is provided with a slide adjustment pin 39 having a pinion (not shown) meshing with the rack 32a of the main guide spindle 32 and a slide stop pin 40 for tightening the slide adjustment pin 39. The camera frame support member 36 has also formed therein guide holes 41 and 41' through which the auxiliary guide spindles 33 and 33', respectively, are slidably inserted. Bearings 42 and 42' are mounted on one of the side edges of the camera frame support member 36, so that the camera frame structure 13 is detachably and hingedly mounted on the camera frame support member 36 through pivotal engagement of the shafts 23 and 23' with the bearings 42 and 42', respectively. A slot 43 is formed on the side edge of the frame support member 36 opposite to the side edge on which the bearing 42 and 42' are mounted, which slot 43 is engageable with the stop member 22 when the camera frame structure 13 is mounted on the camera frame support member 36, as will be mentioned later.

Means 44 is further provided so as to optically seal the space between the support structure 34 and the camera frame support member 36, which means comprises a bellows 45 secured at both ends to supports 46 and 46' through which the sealing means 44 is mounted on the camera frame support member 36 and the support structure 34, respectively.

The slide frame 14 and the camera pack frame structure 15 engaging with the slide frame 14 through the shutter panel 16 are accommodated in the camera pack body 17, all of which are mounted on the camera frame structure 13 through the recesses 19a to 19d to thereby form the photographing means or camera assembly 11. The vertical positions of the slide frame 14, camera pack frame structure 15, shutter panel 16 and camera pack body 17, all held together, are held in place and moved stepwisely downwardly by manipulating the stop member 21, so that a plurality of different images can be photographed on different positions of one and the same photographic film 30.

The photographing means or camera assembly 11 is mounted as a whole on the camera frame support member 36 hingedly through the pivotal shafts 23 and 23' and the bearings 42 and 42', and is secured thereto through engagement of the stop member 22 with the slot 43. The resultant assembly of the photographing means or camera assembly 11 and the frame structure 36 are moved toward and away from the display surface 12a by rotating the slide adjustment pin 39 which is connected to the pinion meshing with the rack 32a, so that the photographing film 30 can be brought into contact with the display surface 12a when the assembly of the photographing means or camera assembly 11 and the camera frame support member 36 is moved to a position closest to the support structure 34 on the measuring instrument 10.

Turning now to FIG. 2, means is provided for detecting the pressure at which the photographic film 30 is held in contact with the display surface 12a, which means includes a pressure modifier means 47 mounted on the camera frame support member 36. The pressure modifier means 47 includes an open-ended outer casing 48, an inner casing 49 which is closed at its leading end and which is slidably inserted into the outer casing 48, and a compression spring 50 accommodated in and between the outer and inner casings 48 and 49, respectively. The inner casing 49 is thus biased forwardly by the action of the compression spring 50. The pressure detecting means further includes a pressure sensitive element 51 which is secured to the support structure 34 and which is positioned in alignment with the pressure modifier means 47. The inner casing 49 which is normally held in a protruded position by the action of the spring 50, contacts the pressure sensitive element 51 as the camera frame support member 36 approaches the support structure 34, as indicated by phantom lines in FIG. 2. As the frame support member 36 is further advanced toward the support structure 34 with the slide adjustment pin 39 rotated so that the photographic film 30 is pressed against the display surface 12a with an increasing pressure, the inner casing 49, pressing upon the pressure sensitive element 51, is gradually retracted into the outer casing 48 against the action of the spring 50, as seen in FIG. 3. The variation in the contact pressure between the photographic film 30 and the display surface 12a is in this manner detected from time to time by the pressure sensitive element 51.

The pressure sensitive element 51 is connected to means for converting the contact pressure, applied to the pressure sensitive element 51, into corresponding electric signals, which are registered visually on a contact pressure indicator 52 which may be mounted on the measuring instrument 10, as illustrated in FIG. 1.

If, now, the spring constant of the compression spring 50 is $k$, then the force $F$ which the pressure sensitive element 51 receives from the pressure modifier means 47 will be expressed as $F = kx$, where $x$ is a between the free length and a compressed length of the spring 50. Thus, a force proportional to the amount of displacement of the camera frame support member 36 is imparted to the pressure sensitive element 51. This means that, if the pressure applied to the pressure sensitive element is known, then not only the position of the camera frame support member 36 relative to the support structure 34 can be properly adjusted but the contact pressure between the display surface 12a of the glass fiber screen and the photographic film 30, which is constantly pressed toward the display surface 12a by a spring mounted behind the film in the camera pack body 17, can be properly adjusted.

When the inner casing 49 is pressed upon the pressure sensitive element 51 and fully retracted into the outer casing 48 against the action of the spring 50, then the pressure applied to the pressure sensitive element 51 is kept constant because, in this instance, the pressure sensitive element 51 is subjected only to the pressure exerted by the compression spring 50 with the outer casing 48 held in abutment to the support structure 34. The pressure modifier 47 thus acts not only to carry a modified pressure to the pressure sensitive element 51 but to protect the element 51 from being subjected to an excess pressure with the outer casing 48 serving as a stop member.

When, now, in photographing an optical image displayed on the display surface 12a of the glass fiber screen 12, the camera frame structure 13, complete with the slide frame 14, camera pack frame structure 15, shutter panel 16 and camera pack body 17, should be mounted on the camera frame support member 36 through pivotal connection of the shafts 23 and 23' with the respective bearings 42 and 42'. The camera frame structure 13 is secured to the camera frame support member 36 by engaging the stop member 22 with the slot 43. The shutter panel 16 should then be pulled upwardly. The slide stop pin 40 is loosened and the slide adjustment pin 39 is rotated to move the camera frame support member 36 with the camera assembly 11 toward the support structure 34, until it is known from reading of the indicator 52 that the photographic film 30 in the camera pack body 17 is brought into contact with the display surface 12a. The contact pressure between the film 30 and the display surface 12a can be adjusted properly by rotating the slide adjustment pin 39. When adjustment of the contact pressure is complete, then the slide stop pin 40 should be rotated to tighten the slide adjustment pin 39, thereby maintaining the film 30 in contact with the display surface 12a with a selected pressure. The camera assembly 11 is now in condition for photographing the image borne on the display surface 12a. In order to photograph an optical image on the display surface 12a for a second time on the same film 30, the stop member 22 should be lowered a step so that the camera pack body 17 in its entirety is accordingly lowered a step, whereby the image on the display surface 12a can be photographed on a different position on the same film 30. When the photographing operation is complete, the slide stop pin 40 should be loosened and the slide adjustment pin 39 rotated until the camera frame support member 36, together with the camera assembly 11, is moved to a position farthest from the support structure 34. Then, the shutter panel 16 should be lowered and the film 30 drawn out of the camera pack body 17 for development and printing.

Where is is desired to visually observe the image on the display surface 12a, the stop member 22 of the camera frame structure 13 should be disengaged from the slot 43 in the camera frame support member 36 so that the frame structure 13 can be rotated about the shafts 23 and 23' away from the support member 36. The display surface 12a of the glass fiber screen 12 can then be readily viewed with human eyes through the opening 37 in the camera frame support member 36.

It will now be apparent from the foregoing description that the photographing arrangement according to the invention is advantageous in that:

a. no sizing means such as a graduated scale need be used because the image on the display surface is photographed on the film in the same size;

b. the images can be photographed on different positions of the same photographic film, providing increased economy and efficiency in photographing operations;

c. the image on the display surface can be visually observed without need of removing the camera assembly from the sliding mechanism including the camera frame support member;

d. the space between the support structure and the camera frame support member is readily accessible because the guide spindles are mounted on the lower portion of the support structure;

e. the camera assembly can be moved back and forth easily and simply by means of a combination rack and pinion mechanism;

f. the camera assembly can be easily assembled and disassembled while the assembly as a whole can be readily attached to and detached from the camera frame support member; and g. the contact pressure between the film and the display surface can be directly read on the contact pressure indicator and adjusted properly from time to time.

What is claimed is:

1. A combination, with a cathode-ray tube having a faceplate on which an optical image is produced and a photographing means which is loaded with a sensitized photographic film on which said optical image is to be photographed, of a glass fiber screen which is attached to said faceplate and which has formed at its leading end an image display surface, moving means for moving said photographing means toward and away from said display surface, detecting means for detecting a contact pressure between said film and said display surface when the film and the display surface are in contact with each other, converting means for converting said contact pressure into electric signals corresponding thereto for adjustment of said contact pressure by said moving means, and sealing means for optically sealing a space between said cathode-ray tube and said photographing means.

2. A combination according to claim 1, wherein said moving means includes a main guide spindle and auxiliary guide spindles mounted in parallel to each other on a support structure which is fixed relative to said cathode-ray tube, and a camera frame support member for detachably supporting said photographing means, which camera frame support member has formed therein an opening shaped, sized and positioned in alignment with said display surface and with said photographing means and includes a hollowed boss member which is positioned in alignment with said main guide spindle and through which the main guide spindle is slidably inserted, guide holes which are located in alignment with said auxiliary guide spindles, and slide adjusting means for sliding said camera frame support member together with said photographing means on said main and auxiliary guide spindles through said boss member and said guide holes.

3. A combination according to claim 2, wherein said slide adjusting means includes a rack member provided on said main guide spindle, a pinion mounted on said boss member and meshing with said rack member, a slide adjustment pin mounted on said boss member and operatively connected to said pinion for rotating the pinion on said rack member to cause said camera frame support member to slide on said main and auxiliary guide spindles, and a slide stop pin mounted on said boss member for tightening said slide adjustment pin to have said camera frame support member properly positioned relative to said support structure.

4. A combination according to claim 2, wherein said main and auxiliary guide spindles are mounted on a lower part of said support structure.

5. A combination according to claim 1, wherein said detecting means comprises a pressure modifier means including an open-ended outer casing fixedly mounted on said camera frame support structure, an inner casing which is closed at its outer end and opened at its inner end and which is slidably inserted into said outer casing and a compression spring accommodated in and between said outer and inner casings, and a pressure sensitive element which is mounted on said support structure in alignment with said modifier means and which is sensitive to pressure carried thereto from said inner casing when the inner casing is in contact with the pressure sensitive element, whereby the contact pressure between said photographing film and said display surface which are in contact with each other is detected.

* * * * *